United States Patent Office 3,346,623
Patented Oct. 10, 1967

3,346,623
IMPROVED PROCESS FOR PREPARING UNSATURATED ESTERS, ALDEHYDES, KETONES, ACETALS AND KETALS BY THE OXIDATION OF OLEFINS WITH A NOBLE METAL CATALYST
Donald C. Young, Fullerton, Calif., assignor to Union Oil Company of California, Los Angeles, Calif., a corporation of California
No Drawing. Filed Apr. 13, 1964, Ser. No. 359,495
10 Claims. (Cl. 260—497)

This invention relates to the oxidation of olefins to carbonyl and other oxygenated compounds with platinum group metals as catalysts and in particular relates to a method for retaining the platinum metal in the reaction zone during the reaction.

The catalysis of the oxidation of olefins to carbonyl and other oxygenated compounds with platinum group metals is a fairly well established art. This process comprises contacting the olefin, in the presence of the platinum group metal, with a compound capable of yielding an anion under the reaction conditions, e.g., water, alcohols or carboxylic acids. When the compound is water, the olefins are oxidized to aldehydes, ketones and slight amounts of acids since the hydroxyl anion yielded by water decomposes to the oxo group. Other embodiments comprise the oxidation of olefins to acetals by contacting the olefin with an alcohol in the presence of the platinum group metal. While vapor phase contacting can be employed, the most common technique comprises contacting the olefin in vapor or liquid state with said compound which is in liquid state and which conveniently is in excess to thereby serve as the reaction medium or solvent.

In the aforementioned oxidation, the reaction involves the simultaneous reduction of the dissolved platinum group metal to the free metal and reoxidation of the metal. To facilitate oxidation of the reduced platinum metal, various redox salts can be employed such as copper and iron halides and these redox metals fluctuate between high and low oxidation states during the reaction. The redox metal is restored to its high oxidation state by contact of the reduced redox agent with an oxygen containing gas.

In one processing technique, the oxidation of the reduced redox agent is achieved in the carbonylation reactor by simultaneously introducing the oxygen containing gas with the olefin. In an alternative processing technique, the redox agent is oxidized in a separate oxidation reactor where the reduced agent is contacted with the oxygen containing gas.

Because a substantial portion of the platinum group metal is present in its reduced state as a precipitate, e.g., the free metal, in the reaction zone, considerable difficulty is experienced in recovering the oxidized products from the reaction zone. When the oxidized products are relatively low boiling e.g., acetaldehyde, methylethyl ketone, etc., these materials can be flashed or continually stripped from the reaction zone during the oxidation. Generally, however, all or a portion of the reactants must be withdrawn from the reaction zone as a liquid phase and distilled to recover the desired products such as the ketones, acetals or unsaturated esters. The solution withdrawn as a crude product from the reactor will normally contain a substantial portion of the platinum group metal as a suspended precipitate together with some insoluble salts of the low oxidation state of the redox metal. The subsequent distillation of this material is troublesome because the precipitates accumulate in the distillation tower and other processing equipment. Particularly irksome in the distillation is the formation of a very tenacious deposit or film of the platinum group metal on the surfaces of the distillation zone. While the adherence of this film to the equipment can be reduced somewhat by the use of titanium equipment and linings, the precipitates in the crude reaction product can cause difficulties by clogging transfer lines, heat exchange surfaces, etc. The problem can not be completely eliminated by filtering the crude oxidation product to remove these precipitates prior to distillation since considerable amounts of the platinum group metal are dissolved in the product and precipitate only upon subsequent handling or distillation.

It is an object of this invention to provide an efficient method for the oxidation of olefins to valuable oxidized products.

It is also an object of this invention to provide a method for the oxidation of the olefins with platinum group metals wherein the platinum group metal is maintained on a solid substrate during the oxidation.

It is a further object of this invention to provide a solid substrate upon which the platinum group metal is deposited and retained during the oxidation.

Other and related objects of this invention will be apparent from the following description of the invention.

I have now found that the platinum group metal can be retained in the reaction zone by contacting the olefin in the presence of an anion exchange solid. Under the reaction conditions, the platinum group metal forms a negatively charged complex that is ionically bonded to the ion exchange solid even though the platinum group metal fluctuates from the high to low oxidation state. In one embodiment, the platinum group metal can be base exchanged onto an anion exchange solid that is insoluble in the particular reaction medium and that is stable and inert to the conditions in the oxidation zone to thereby capture and retain the metal within the oxidation zone. In this manner, the aforementioned difficulties experienced in handling the crude oxidate and recovery of the desired products can be avoided. The platinum group metal, particularly palladium, is reduced to the free metal repeatedly during the oxidation. It was therefore expected that the free metal would separate from the resin during the oxidation. Quite unexpectedly, however, I discovered that even in the reduced state, some negatively charged ligand apparently complexes the metal and retains it on the anion exchange resin. Prior art on acetaldehyde synthesis has suggested the use of various carrier solids to support the catalyst, including cation exchange solids; see U.S. Patents 3,057,915 and 3,106,579. The cation exchange solids however do not retain the platinum group metal in the presence of a liquid phase and hence do not function differently than any inert finely divided solid. In contrast, the anion exchange solids of my invention retain the platinum group metal in the reaction zone during all stages of the reduction and oxidation.

Either of the aforementioned regeneration techniques can be employed when using the anion exchange solid of my invention. Thus, oxygen can be introduced into the reactor simultaneously with the olefin, preferably in limited amounts to maintain less than about 2-5 percent oxygen in the exit gas and thereby avoid any explosive concentrations. Alternatively, the olefin can be contacted with the anion yielding compound until the platinum metal is completely reduced, then contact with the olefin is discontinued and oxygen is introduced to oxidize the platinum metal. To provide extended reaction periods, redox agents hereafter described can be added to the reaction zone. Two or more reactors can be packed with the anion exchange solid and used by alternately switching the reactors from contact with the olefin to contact with oxygen. Because the secondary or redox agents hereafter described are not absorbed by the anion exchange solid, a convenient processing technique employing separate oxidation of the redox agent can be used. In this method, the olefin and anion yielding compound are introduced into contact in the reactor packed with the anion exchange solid that contains the ionically bonded platinum group metal. The anion yielding compound is in liquid phase and contains the redox agent in solution. In passage over the anion exchange solid containing the platinum group metal the redox agent is reduced in repeated restoration of the platinum group metal to its highest oxidation state. The product which contains the reduced redox agent is withdrawn as a liquid phase and distilled to recover the desired oxidized product from the excess of the anion yielding compound or other reaction solvent. The solvent, which still contains the reduced redox agent is then contacted with oxygen to restore the redox agent to its higher valence for recycling to contact with the olefin in the reactor packed with the anion exchange solid.

Various organic and inorganic solids possessing the capacity to base exchange an associated anion for an anion in a polar solvent, e.g., alcohols, carboxylic acids or aqueous solutions can be employed. Solids having base exchange capacities from about 1 to about 500 milliequivalents per 100 grams can be used. These solids should be inert to the reaction solvent and insoluble therein. Various anion exchange solids which comprise high molecular weight polyelectrolytes that are crosslinked into an insoluble matrix can be used. These polyelectrolytes can be organic and in this form generally comprise a synthetic polymer containing basic nitrogen functional groups which contain the nitrogen in its positive valency, e.g., ammonium, quaternary ammonium, amidinium radicals, etc. The polymer molecular weight can be from 2500 to 500,000 units. Examples of such are polystyrene resins containing along the polymer length side chains bearing quaternary amines. To introduce crosslinking, styrene is frequently polymerized with divinyl benzene containing dependent basic nitrogen groups which are subsequently treated to convert the basic nitrogen to the ion-exchanging ammonium group. Other examples of organic resins that can be employed comprise polyalkylene amines crosslinked by copolymerization with diolefins forming an alkylene bridge. The amine functional groups are of course converted to ammonium groups to impart base exchange properties.

The preparation of the organic anion exchange resins is conventional in the art. A suitable preparation is as follows: 500 grams water, 400 grams m-phenylene diamine, 225 grams concentrated hydrochloric acid and 210 grams of ice are stirred until the m-phenylene dissolves. Then 60 grams of polyethylene diamine, 150 grams of hydrochloric acid and 150 grams of ice are added and the temperature is raised to 8° to 11° C. To the mixture is then added 825 grams formaldehyde and the temperature is lowered to 2°–3° C. by addition of 150 grams ice. After several hours, the resin is separated from the liquid medium and dried.

In another preparation, a copolymer of styrene and divinyl benzene containing 9 mols styrene per mol divinyl benzene is nitrated, then reduced. To 20 parts nitric acid and 30 parts sulfuric acid are added 12 parts of the copolymer. The mixture is refluxed for 2 hours, filtered and the resin washed. The nitration is repeated and the resin finally washed and dried. The nitrated copolymer is then reduced with 23 parts stannous chloride and 100 parts hydrochloric acid at reflux temperature. The product is washed with dilute sodium hydroxide and dried.

Organic anion exchange resins are commercially available and the following is a listing of some of the commercially available materials:

Amberlite IRA–400 and IRA–401 which comprise a crosslinked polystyrene matrix having quaternary nitrogens in trimethyl amine groups along the polystyrene chain.

Dowex-1, -2 and -3 which are styrene divinyl benzene copolymers containing quaternary nitrogens as amine groups along the chain length; etc.

In general, the organic anion exchange solids have base exchange capacities from about 50 to about 400 milliequivalents per 100 grams of dry resin.

The inorganic anion exchange solids are preferred for used where the reaction conditions are too severe for most organic resins. In general, the organic resins can be obtained that are resistant to thermal and oxidative degradation up to temperatures of about 150°–200° C. The use of reaction conditions more severe than aforementioned requires the use of more stable ion exchange solids. For this use, the inorganic solids possessing anion exchange capacity are preferred, and examples of such are hydrous oxides of various metals, e.g., zirconium oxide, aluminum oxide, chromium oxide, ferric oxide, bismuth oxide, titanium oxide, thorium oxide, tin oxide, niobium oxide, tantalum oxide, etc. These hydrous oxide ion exchange solids can be prepared by suitable precipitation reactions as described in Journal of American Chemical Society, 78, page 249 and 694 (1956), by K. A. Krouse and H. O. Phillips. The preparation in general comprises raising the pH of a solution of the metal so as to precipitate the metal as a hydrous oxide. Such precipitation can be effected by the addition of base, usually ammonia, to acidic solutions of the particular metal. The flocculant or gelatinous precipitate is collected by conventional solid-liquid separation, e.g., centrifugation or filtration. The recovered solid is dried, ground and sized to the desired subdivision.

The platinum group metal employed can be of the palladium sub-group or platinum sub-group, i.e., palladium, rhodium, ruthenium or palladium, osmium, or iridium. While all of these metals are active for my reaction, I prefer palladium because of its much greater activity.

The platinum group metal is incorporated in the anion exchange resin by preparing a negatively charged complex of the platinum group metal with a suitable lignad and then base exchanging the complex onto the resin. Preferably, a halogen complex such as the chloro or fluoro complex is employed; however, platinum group metals also from negatively charged complexes with the following ligands which may therefore also be used: iodo, bromo, hydroxyl, oxalato, thiocyano, nitro and cyano. Illustrative of such negatively charged complexes are the following:

trichloroplatinate, tetrachloroplatinate,
hexacyanorhodate, hexanitrorhodate
hexachlororhodate, hexathiocyanorhodate
hexachloroiridate, hexabromoiridate,
hexafluororuthenate, hexachlororuthenate,
pentachloronitroruthenate, pentacyanonitroruthenate,
pentachlorohydroxyruthenate, hexachloroosmate,
hexabromoosmate, hexachlororhenate,
tetrachlororhenate, hexabromorhenate,
octacyanorhenate, hexachloropalladate,
hexabromopalladate.

The preparation of the complex is apparent to those skilled in the art, e.g., see Advanced Inorganic Chemistry by F. A. Cotton and G. Wilkinson (1962). In general, a soluble salt of the platinum group metal is added to a solution of the lignad such as aqueous hydrochloric acid, hydrofluoric acid in acetic acid, oxalic acid, aqueous thiocyanic acid, alcoholic nitric acid, aqueous cyanic acid, etc. The ligand should generally be present in an amount sufficient to insure complete complexing of the platinum group metal, generally between 0.1 and 2 normal solutions of the aforementioned acids are sufficient. Formation of the halo complexes can be favored by bubbling the particular halogen into the solution during the preparation.

The resulting solution of the negatively charged complex is thereafter contacted with the solid anion exchange solid; preferably at ambient temperatures and atmospheric pressure to base exchange the complex for the anion associated with the ion exchange site of the exchange solid.

The solid can then be washed, dried and packed into the reactor.

In a convenient preparation, the reactor can be packed with the anion exchange solid and a solution of a negatively charged platinum metal complex circulated over the solid. This technique can be combined with the reaction by adding a soluble salt of the platinum metal to the aforementioned solutions and circulating this solution through the reactor while introducing the olefin and oxygen into the reactor to contact the solution. Preferably, the reaction solution is preheated to the desired reaction temperature to commence the oxidation. The base exchange of the platinum metal to the anion exchange solid will occur during the oxidation to incorporate the complex on the solid and thereby retain the platinum group metal in the reactor.

The amount of platinum group metal base exchanged onto the anion exchange solid can vary between about .01 and about 0.1 weight percent of the composite. Preferably, the platinum group metal is deposited in an amount sufficient to equal the exchange capacity of the ion exchange solid.

After the platinum group metal has been exchanged onto the anion exchange solid, the latter can be pulverized to the desired degree of subdivision or can be admixed with inert solids together with a suitable binder and the resultant mixture pelleted or extruded to prepare particles having the proper size for use in a packed fixed bed reactor. The size of particles so prepared depends substantially upon the type of gas-liquid-solid contacting technique employed in the process. The ion exchange solid can be employed as a finely divided powder in the reaction medium in a slurry technique. If desired, the catalyst can also be employed as more or less granular pellets or extrudates in a packed fixed bed reactor. When employed in the slurry technique, the particle size of the solid can be between about 50 and about 100 mesh. When a fixed bed reactor is to be employed, the particle size is preferably from about ⅛ to about ¼ inch.

The ion exchange solid charged with the platinum group metal can be employed in admixture with various other solids such as silicas, e.g., silica gel, diatomaceous earth, quartz, etc., silicon carbides, e.g., carborundum, titanium; carbon; etc. This dilution with an inert solid is preferred in the fixed bed technique to dilute the highly active catalyst and thereby prevent runaway reactions.

Olefins that can be oxidized to carbonyl compounds in my oxidation can be any hydrocarbon olefin having from 2 to about 25 carbons. Examples of specific olefins are: ethylene, propylene, butene-1, butene-2, pentene-1, pentene-2, hexene-1, hexene-2, heptene-1, octene-1, 3-ethylpentene-1, nonene-1, decene-1, butadiene, pentadiene, cyclopentene, cyclohexene, indene, styrene, allylbenzene, etc.

Carbonyl products from oxidation in the aqueous acid medium comprise acetaldehyde, methylethyl ketone, acetone, cyclohexanone, acetophenone, etc., the oxo atom replacing a hydrogen atom on one of the olefinic carbons, preferentially the hydrogen on a secondary carbon. Esters of carboxylic acids and unsaturated alcohols are obtained when the reaction medium comprises the carboxylic acid, e.g., vinyl acetate, allyl acetate, propenyl acetate, vinyl propionate, vinyl benzoate, etc. Acetals and ketals are obtained from the olefins when the reaction medium comprises an alcohol. Examples of such products are 1,1-diethoxyethane, 1,1-dimethoxyethane, 1,1-diisopropoxyethane, 2,2-dimethoxypropane, etc.

It is apparent therefore that the product of my oxidation depends considerably upon the reaction medium used. To prepare aldehydes and ketones from olefins, aqueous solutions having acidic pH's, e.g., from about 7 to about 1, and preferably from about 7 to about 3 are employed. Preferably aqueous hydrochloric acid solutions are used, however, various inert organic solvents can be employed in combination therewith in amounts comprising between about 0 and about 90, preferably between about 0 and about 30 percent of a reaction medium. Examples of suitable inert solvents are formamide, dimethyl formamide, chlorobenzene, dichlorobenzene, aliphatic hydrocarbons such as hexane, decane, dodecane, etc.; aromatics such as toluene, xylene, pseudocumene, etc.

For the oxidation of olefins to acetals and ketals, the organic solvent employed is an aliphatic alcohol that is liquid under the reaction conditions. To provide for simultaneous reoxidation of the catalyst in the reaction zone, it is desired that this alcoholic solution have an acidic pH of the values previously mentioned. Aliphatic alcohols having from 1 to about 20 carbons can be employed such as methanol, ethanol, isopropanol, propanol, butanol, isobutanol, pentanol, isopentanol, hexanol, isohexanol, heptanol, isoheptanol, cyclohexanol, octanol, isooctanol, decanol, isodecanol, tridecanol, isododecanol, pentadecanol, isohexadecanol, octadecanol, tricosanol, isotetracosanol, pentacosanol, etc. Preferably, primary or secondary low molecular weight alcohols having from 1 to about 5 carbons are employed such as methanol, decanol, propanol, isopropanol, butanol, isobutanol, pentanol, isopentanol, cyclopentanol, etc.

For the preparation of unsaturated esters of carboxylic acids, the reaction medium should comprise a carboxylic acid having from 1 to about 20 carbons such as acetic, propionic, butyric, valeric, isovaleric, caprylic, isocaprylic, succinic, glutaris, butyric, adipic, pimelic, etc. Preferably, the carboxylic acid employed is the acid of the desired acyloxy radical desired in the unsaturated ester, e.g., acetic acid is used in the preparation of vinyl acetate, propionic acid is employed in the preparation of vinyl propionates, etc. In addition, any inert organic solvent can be employed with the carboxylic acid reaction medium. Additionally, aqueous carboxylic acids can be employed as the reaction medium to produce a mixture of the aldehyde or ketone of the olefin together with the unsaturated ester.

Various other inert organic solvents can be employed in addition to the water, reactive alcohol or carboxylic acid aforementioned. Examples of various organic liquids that can also be present in amounts between about 0 and about 90 percent of the reaction medium employed for the synthesis of acetals or unsaturated esters include formamide, dimethyl formamide, chlorobenzene, dichlorobenzene, aliphatic hydrocarbons such as hexane, decane, dodecane, etc.; toluene, xylene, pseudocumene, etc.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts, however, are preferred in this oxidation because of their greater solubility and hence, the greater acetate ion concentration that can be achieved with the use of lithium.

It is of course apparent that the carboxylate salts can be formed in situ by the addition of the hydroxides of most of the aforementioned metals, particularly the alkali metal hydroxides or halides.

As previously mentioned, various redox compounds can, optionally, be used in the reaction medium. In general, any multivalent metal salt having an oxidation potential higher, i.e., more positive, than the platinum metal in the solution can be used. Typical of such are the soluble salts of multivalent metal ions such as the acetates, bromides or chlorides of copper, iron, manganese, cobalt, mercury, nickel, cerium, uranium, bismuth, tantalum, chromium, molybdenum or vanadium. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as nitric acid, a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetroxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of the nitrogen oxide as redox agents does not apperciably alter the yields of the major products, i.e., acetals, vinyl acetate, acetaldehyde and/or acetic acid, however, it is apparent to those skilled in the art that the nitrogen oxides should be used with caution in the alcoholic reaction medium used in acetal synthesis.

The oxidation conditions comprise temperatures from about 15° to 300° C. and pressures from atmospheric to 1500 p.s.i., although the elevated pressures are preferred to obtain a high oxidation rate. In the oxidation of olefins to unsaturated esters, e.g., ethylene to vinyl acetate, the olefin is introduced into contact with the carboxylic acid in presence of the catalyst at temperatures between about 30° and about 300° C. Temperatures from about 90° to about 180° C. are preferred and, to obtain optimum yields of unsaturated esters, temperatures between about 120° and about 160° C. are most preferred. In the oxidation of ethylene to vinyl acetate, high yields of acetic acid are favored at the higher temperatures and therefore, when operating so as to generate sufficient acetic acid in situ to equal that consumed in the formation of vinyl acetate, the higher temperatures are preferred in this synthesis, from about 130° to about 180° C.

In the oxidation of olefins to acetals, particularly the oxidation of ethylene to 1,1-diethoxyethane, temperatures between about 30° and about 200° C.; between about 80° and about 150° C. are preferred.

The reaction pressures employed in the oxidations are preferably sufficient to maintain liquid phase conditions. From about atmospheric to about 100 atmospheres or more, preferably elevated pressures from about 10 to about 75 atmospheres are employed and most preferably, pressures from about 40 to about 75 atmospheres can be used to obtain a high reaction rate. In general, high olefin partial pressures result in maximum rates of oxidation. Additionally, the use of high olefin partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rate to prevent the accumulation of substantial amounts of water that will otherwise reduce the rate of oxidation.

The invention will now be illustrated by the following examples:

Example 1

A commercially available organic anion exchange solid, Dowex 21K, resin, was contacted with an aqueous solution of palladium dichloride in dilute hydrochloric acid. The contacting was continued until the aqueous solution lost its red color and the resin had become red. Ethylene was then bubbled into contact with the solution and resin at ambient temperatures until the resin became black from the reduced form of palladium. Throughout the contacting the solution remained colorless.

A slight amount of cupric chloride was then added to the solution which became blue from the presence of the copper salt. No copper was absorbed by the resin. Air was then slowly bubbled through the system until the resin color was restored to the initial red coloration. In repeated reductions with ethylene and oxidations of the resin, the palladium remained on the anion exchange resin.

Similar results were obtained when the anion exchange resin was impregnated with palladium chloride from an acetic acid solution of palladium chloride and lithium chloride. Subsequent reduction of the resin in acetic acid produced the same blackening of the resin and the red coloration was restored by oxidation in the acetic acid containing slight amounts of cupric chloride. The solutions were analyzed and indicated presence of acetaldehyde in the aqueous hydrochloric acid experiment and the presence of vinyl acetate in the acetic acid experiment.

Example 2

An inorganic ion exchange solid-palladium complex was prepared by placing 1000 grams of a commercial zirconium oxide anion exchange solid (Bio-Rad HZ0-1) in a flask to which was added a solution 500 milliliters acetic acid containing 25 grams lithium chloride, 25 grams lithium acetate dihydrate, and 33 grams palladium chloride. The mixture was stirred at room temperature for 12 hours, filtered and the separated solid washed with acetic acid, then dried. The solid was placed in an aqueous hydrochloric acid solution and ethylene was introduced until the solid became black. Acetaldehyde was formed in the solution. Then oxygen was introduced into contact with the solid to restore the initial pink coloration. Repeated contact with ethylene again produced acetaldehyde. Substantially the same color changes were observed when the test was repeated in acetic acid to produce vinyl acetate.

The preceding examples are not intended to unduly limit my invention but are intended to illustrate a mode of practice thereof and to demonstrate the results obtainable by such practice. My invention is intended to be defined by the step or steps, or their equivalents, set forth in the following claims.

I claim:

1. In the oxidation of a hydrocarbon olefin having 2 to 25 carbons to valuable oxygenated compounds selected from the class consisting of:
   (a) unsaturated esters of carboxylic acids;
   (b) acetals and ketals; and
   (c) aldehydes and ketones;

wherein the olefin is contacted in a reaction zone at a temperature from 15° to 300° C. and a pressure from atmospheric to about 1500 p.s.i. to maintain liquid phase conditions with a platinum group metal catalyst and in the presence of a reaction medium selected from the class consisting of:
(a) substantially anhydrous aliphatic carboxylic acids having 1 to about 20 carbons;
(b) substantially anhydrous aliphatic monohydroxy alcohols having 1 to about 20 carbons; and
(c) aqueous acids having a pH from 1 to about 7; to prepare unsaturated esters when said member is selected as a carboxylic acid, to prepare acetals and ketals when said member is selected as a monohydroxy alcohol and to prepare aldehydes or ketones when said member is selected as said aqueous acid;
the improvement that comprises:
employing said platinum group metal catalyst as a negatively charged complex selected from the class consisting of halo, hydroxyl, oxalato, thiocyano, nitro and cyano complexes of said platinum group metal, said complex being ionically bonded to the ion exchange sites of an anion exchange solid selected from the class consisting of inorganic hydrous metal oxides and organic polymers having molecular weights from 2500 to 500,000 units and having basic nitrogen functional groups; said anion exchange solid having a base exchange capacity from 1 to about 500 milliequivalents per 100 grams in said reaction zone.

2. The oxidation of claim 1 wherein said complex is a chloropalladate.

3. The oxidation of claim 1 wherein said compound is water, said olefin is ethylene, said product is acetaldehyde and said negatively charged complex is a chloropalladate.

4. The oxidation of claim 1 wherein said compound is an aliphatic carboxylic acid, said olefin is ethylene, said product is a vinyl ester of said carboxylic acid and said negatively charged complex is a chloropalladate.

5. The oxidation of claim 1 wherein said contacting is effected in the presence of a redox agent selected from the class consisting of oxides of nitrogen and multivalent metals having an oxidation potential more positive than that of said platinum metal and mixtures thereof.

6. The oxidation of claim 1 wherein a liquid phase is withdrawn from the reaction zone containing said reaction medium and oxidation product.

7. The oxidation of claim 1 wherein said reaction medium is selected to be said aliphatic carboxylic acid and comprising the additional step of incorporating from 0.1 to 10 weight percent of an alkali metal salt of said carboxylic acid.

8. The oxidation of a hydrocarbon olefin having 2 to 25 carbons to an oxygenated product selected from the class consisting of:
(a) unsaturated esters of carboxylic acids;
(b) acetals and ketals; and
(c) aldehydes and ketones;
comprising the steps:
(1) introducing said olefin into a reaction zone containing a catalyst comprising an anion exchange solid selected from the class consisting of inorganic hydrous metal oxides and organic polymers having molecular weights from 2,500 to 500,000 units and having basic nitrogen functional groups; said anion exchange solid having ionically bonded at its ion exchange sites a negatively charged halo, hydroxyl, oxalato, thiocyano, nitro or cyano complex of a platinum group metal;
(2) also introducing into said reaction zone to contact with said olefin a liquid reaction medium containing a redox agent capable of having a high and a low valence state in said liquid selected from the class consisting of nitric acid, nitrates, nitrites and soluble salts of multivalent metals having oxidation potentails more positive than said platinum metal in said liquid; said reaction medium comprising a compound selected from the class consisting of an aqueous acid having a pH from 1 to 7, aliphatic alcohols having 1 to about 20 carbons and aliphatic carboxylic acids having 1 to about 20 carbons to prepare said unsaturated esters when said compound is selected to be said carboxylic acid, to prepare said acetals and ketals when said compound is selected to be said monohydroxy alcohol, and to prepare said aldehydes and ketones when said compound is selected to be said water;
(3) maintaining said reaction zone at a temperature between 30° and 300° C. and under pressure from 1 to about 100 atmospheres to maintain said compound in liquid phase; and
(4) withdrawing a liquid crude oxidate containing said oxygenated product from said reaction zone.

9. The oxidation of claim 8 comprising the additional step of introducing oxygen into said reaction zone and, when said reaction medium is selected to be said alcohol, the additional step of employing sufficient hydrochloric acid in said medium to maintain the pH of said medium from about 1 to 7.

10. The oxidation of claim 9 wherein said crude oxidate contains said redox agent in its low valence state comprising the additional steps of:
(1) distilling said oxidate to remove therefrom said oxygenated product from said liquid reaction medium;
(2) contacting said liquid reaction medium with oxygen to restore said redox agent to its high valency state; and
(3) returning said liquid reaction medium containing the redox agent in its restored high valence state to said reaction zone.

References Cited

UNITED STATES PATENTS

| | | | |
|---|---|---|---|
| 3,057,915 | 10/1962 | Riemenschneider et al. | 260—597 |
| 3,086,994 | 4/1963 | Smidt et al. | 260—597 |
| 3,190,912 | 6/1965 | Robinson | 260—497 |
| 3,221,045 | 11/1965 | McKeon et al. | 260—497 |

FOREIGN PATENTS

| | | |
|---|---|---|
| 628,848 | 6/1963 | Belgium. |
| 137,508 | 4/1961 | Russia. |

LORRAINE A. WEINBERGER, *Primary Examiner.*

V. GARNER, *Assistant Examiner.*